United States Patent [19]

Costanza et al.

[11] 4,360,541
[45] Nov. 23, 1982

[54] RADIATION CURED MICROVOID COATINGS

[75] Inventors: John R. Costanza, North Plainfield; George Collins, Irvington, both of N.J.

[73] Assignee: Celanese Corporation, New York, N.Y.

[21] Appl. No.: 237,216

[22] Filed: Feb. 23, 1981

[51] Int. Cl.$^3$ .............................................. B05D 3/06
[52] U.S. Cl. ............................. 427/54.1; 204/159.15; 204/159.22; 204/159.23
[58] Field of Search ................. 427/54.1; 204/159.15, 204/159.22, 159.23

[56] References Cited

U.S. PATENT DOCUMENTS

| | | | |
|---|---|---|---|
| 3,759,807 | 9/1973 | Osborn et al. | 204/159.23 |
| 3,933,935 | 1/1976 | Zachariades et al. | 260/37 EP |
| 3,982,942 | 9/1976 | Lu | 204/159.14 |
| 4,005,244 | 1/1977 | Wismer et al. | 427/54.1 |

*Primary Examiner*—Melvyn I. Marquis
*Attorney, Agent, or Firm*—Depaoli & O'Brien

[57] ABSTRACT

This invention provides a process for preparing self-pigmented ultraviolet cured coating compositions, which involves preparing a dispersion of water in certain poly-unsaturated ultraviolet curable monomers at a solids level of about 35 to about 85 weight percent, applying the dispersion as a coating on a substrate and curing the substrate coating by exposure to ultraviolet light. These cured compositions have utility as self-pigmented protective coatings.

4 Claims, No Drawings

RADIATION CURED MICROVOID COATINGS

BACKGROUND OF THE INVENTION

This invention relates to ultraviolet curable coating compositions. More particularly, this invention relates to ultraviolet curable coating compositions which are internally self-pigmentable and need no external pigmentation in order to evidence a white appearance that hides the substrate on application to the desired substrate.

Ultraviolet curable coating compositions are well known in the art. Their use has increased dramatically in recent years due to coating industry concerns about reducing polluting effluents. Another major concern has been a reduction in the amount of energy required to ultimately cure the coating to the desired degree of crosslinking. In non-pigmented coatings (clears) cure response has not been a problem in most instances apparently because clear coatings allow substantial through-and-through penetration of the film by the ultraviolet light. However, with pigmented coatings a different problem has arisen, particularly with white, titanium dioxide-based coatings. In these instances, cure response properties have in many cases been so reduced that the coating did not cure below the surface leaving a non cured liquid sub-surface, or the coating remained soft and tacky.

Thus, it is an object of this invention to prepare coating compositions which are curable under minimal applications of ultraviolet energy.

It is another object of this invention to prepare coating compositions which, while pigmented, are still curable without the employment of excessive amounts of incident ultraviolet radiation.

These and other objectives are obtained by preparing the compositions of the instant invention.

SUMMARY OF THE INVENTION

Basically, the instant invention involves the discovery that non-pigmented "white" coating compositions may be obtained if water is dispersed in prior art ultraviolet crosslinkable monomers utilizing any of a number of surfactants which do not interfere with the ultraviolet curing mechanism at dispersion solids levels in the range of about 35 to about 85 weight percent. The resulting coatings, when cured under ultraviolet light, are "white" in color and may be utilized in place of prior art titanium dioxide-containing ultraviolet curable pigments, or also in place of conventional coatings.

DESCRIPTION OF INVENTION

The process of the instant invention basically involves dispersing water in typical ultraviolet curable monomers in the presence of an ultraviolet photoinitiator and optionally an organic amine. Obviously, only those ultraviolet curable monomers which are emulsifiable in water (i.e., can form a dispersion with water) may be employed. Thus, for example, solid ultraviolet curable monomers, or monomers having relatively high molecular weights, may not be employed if they are not emulsifiable in water. In addition, substantial amounts (more than about 20 weight percent, based on the monomers) of a water-soluble monomer may not be employed if it does not emulsify or if it inhibits emulsification.

The emulsification process itself may employ any of the standard surfactants, providing that the surfactants do not interact with the monomers and prevent their crosslinking upon the application of ultraviolet energy.

The emulsification (i.e., the dispersion of water in the monomer mixture) may be accomplished over a range of water contents. For example, the solids content may range from about 35 weight percent up to about 85 weight percent, preferably from about 50 to about 75 weight percent.

The amount of the surfactant which should be used can vary from about 1 to about 20 weight percent, based on the weight of solids and preferably from about 3 to about 7 weight percent.

Examples of the nonionic surfactants include basically those polyalkyleneoxy-containing materials having as a base substituent mono- or polyhydric phenols. Anionic surfactants include for the most part salt-type materials which are generally of the carboxylic acid or sulfonic or phosphoric acid-based materials. Cationic surfactants include for the most part materials which are amine salts of low molecular weight carboxylic or mineral acids. Examples of particular surfactants include those surfactants that promote stable water-in-oil dispersions, especially those that contain greater than 50% solids. Illustrative of the surfactants are: Igepal CO 530, Igepal CO 630, Igepal CO 730, Igepal DM 430, Igepal DM 530, Igepal DM 710, Igepal RC 520, Pluronic L42, Pluronic L62, Pluronic L72, Aerosol OT, along with combinations of these and other surfactants.

In carrying out the emulsification of the instant invention one of two processes may be utilized. In the first process, the water and the surfactants are mixed together and are slowly added to the coating formulation while stirring with a high shear agitator.

In an alternate process, the surfactants are added to the coating formulation along with the other components. Then water is slowly added to the coating formulation containing surfactant while stirring with a high shear agitator.

After the dispersion is formed (or before) the photoinitiators, photosensitizers, amine activators, or any of the other materials described herein, may be added and the material applied to the desired substrate and cured by incident ultraviolet radiation.

The monomers which are useful herein are aqueous emulsifiable alpha beta ethylenically unsaturated vinyl polymerizable compounds containing at least two vinyl polymerizable groups per molecule. These materials should comprise from about 20 to about 100 weight percent of the curable portion of the compositions of the instant invention. Included are unsaturated esters of polyols and particularly such esters of the alpha ethylene carboxylic acids. e.g., ethylene glycol diacrylate, diethylene glycol diacrylate, glycerol diacrylate, glycerol triacrylate, ethylene glycol dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetraacrylate and methacrylate, trimethylolpropane triacrylate, trimethylolethane triacrylate, dipentaerythritol hexacrylate, tripentaerythritol octaacrylate, sorbitol hexacrylate, 1,3-propanediol diacrylate, 1,5-pentanediol dimethacrylate, 1,6-hexanediol diacrylate, the bis-acrylates and methacrylates of polyethylene glycols of a molecular weight of 200–1500, having viscosities which would allow stirring and pouring of the materials at room temperature, and the like; unsaturated amides, particularly those of the alpha ethylene carboxylic acids, especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gamma-methacrylamidopropoxy) ethane, beta-methacrylamidoethyl methacrylate, N-beta-hydroxy-ethyl-beta-(methacrylamido) ethyl acrylate, and N,N-bis(-beta-methacryloxyethyl) acrylamide; vinyl esters, such as divinyl succinate, divinyl adipate, divinyl phthalate, divinyl terphthalate, divinyl benzene-1,3-disulfonate, and divinyl benzene-1,4-disulfonate; styrene and derivatives thereof and unsaturated aldehydes, such as sorbaldehyde (hexadienal). A particularly preferred addition polymerizable components are the esters and amides of alpha-methylene carboxylic acids and substituted carboxylic acids with polyols and polyamides wherein the molecular chain between the hydroxyl and amino groups is solely carbon or oxygen-interrupted carbon.

The polyethylenic unsaturation can be present as a substituent attached to a preformed emulsifiable polymer resin, such as alkyd, a polyester, a polyamide, a polyurethane or a vinyl homo- or copolymer, as long as the material contains no added solvent and is pourable or handleable at room temperature. Non-pourable materials can be utilized if they are first dissolved in the monomers described previously. Generally, this means that the material should have a Gardner Holdt viscosity at room temperature and essentially 100 percent solids of less than about Z-4. Also included are polymers containing maleic and fumaric acids or esters, as well as polymeric unsaturated materials prepared by reacting vinyl hydroxy or carboxy materials with polyepoxides, e.g., acrylic acid with the diglycidyl ether of bisphenol A. Also included are polymers such as polyvinyl acetate/acrylate, cellulose acetate/acrylate, cellulose acetate/methacrylate, N-acryloxymethylpolyamide, N-methacryloxymethylpolyamide, allyloxymethylpolyamide, etc.

In addition to the aforementioned polyfunctional polymerizable compounds, compounds containing a single polymerizable ethylenically unsaturated group of the structure

can also be utilized. In addition to traditional "monomers", as described hereafter, the monounsaturated compounds may be polymeric materials, as previously described, containing on the average a single site of unsaturation on each polymer molecule. These monomers can be aliphatic, aromatic, cycloaliphatic or any variant thereof. Among the monomers are included styrene, 4-methylstyrene, alphamethylstyrene, and the like; acrylic acid and its nitrile, amide and $C_1$-$C_{12}$ alkyl, aryl, or hydroxy alkyl derivatives, such as acrylonitrile, ethyl acrylate, 2-ethylhexyl acrylate, butoxy- or ethoxyethyl acrylates, hydroxyethyl acrylate, as well as others; the vinyl halides, such as vinyl chloride, vinylidene chloride, and the like; vinyl ketones such as vinyl phenyl ketone, vinyl methyl ketone, alpha-chlorovinyl methyl ketone, and the like; the vinyl thioethers such as vinyl ethyl sulfide, vinyl p-tolylsulfide, divinyl sulfide, and the like. Other monomers include vinyl ethyl sulfone, vinyl ethyl sulfoxide, vinyl sulfonic acid, sodium vinyl sulfonate, vinyl sulfonamide, vinyl pyridine, N-vinyl pyrrolidone, N-vinyl carbazole, and the like. Generally any alpha beta ethylenically unsaturated monomer which does not interfere with the ultraviolet curing mechanism may be utilized, and as such, these monomers are well known in the art.

These traditional monomers may be added in amounts up to about 60 weight percent, based upon the total curable composition weight, and preferably about 10 to about 30 weight percent.

The instant invention can also contain up to about 60 weight percent, based upon the total curable system, of a polymeric material containing no polymerizable unsaturation, provided that the polymeric material is emulsifiable and has a Gardner Holdt viscosity at room temperature with no non-aqueous solvent present of less than about Z-4. Among the polymers are the polyolefins and modified polyolefins, the vinyl polymers, the polyethers, the polyesters, the polylactones, the polyamides, the polyurethanes, the polyureas, the polysiloxanes, the polysulfides, the polysulfones, the polyformaldehydes, the phenol-formaldehyde polymers, the natural and modified natural polymers, the heterocyclic polymers, and the like.

Illustrative of these polymers are the acrylic polymers such as poly(acrylic acid), poly(methyl acrylate), poly(ethyl acrylate), poly(methacrylic acid), poly(methyl methacrylate), poly(ethyl methacrylate); poly(vinyl chloride); poly(vinyl alcohol); poly(ethylene/propylene/5-ethylidenebicyclo[2.2.1]-hept-2-ene); polyethylene; polypropylene; synthetic rubbers, e.g., butadiene/acrylonitrile copolymers and chloro-2-butadiene 1,3 polymers; the polyesters, copolyesters, polyamides and copolyamides, such as polycaprolactone, poly(caprolactone/vinyl chloride), poly(ethylene glycol terephthalate), poly(hexamethylene succinate), poly(hexamethylene maleate), poly(hexamethylene carbonate), poly(caprolactam), poly(hexamethylene adipamide), and the like; the polyethers such as poly(glutaraldehyde), polyethylene oxide, polypropylene oxide, poly(tetrahydrofuran), polycyclohexene oxide, copolymers of ethylene oxide and propylene oxide with starters containing reactive hydrogen atoms such as the mixed copolymers using ethylene glycol, glycerol, sucrose, etc., as the starter; vinylidene polymers and copolymers, e.g., vinylidene chloride/acrylonitrile, vinylidene chloride/methacrylate and vinylidene chloride-vinyl acetate polymers; ethylene/vinyl acetate copolymers; the polyureas and polyurethanes, such as described in *Polyurethanes: Chemistry and Technology*, Volumes I and II, Sanders and Frisch, published by Interscience Publishers; the polycarbonates; polystyrenes; polyvinyl acetals, e.g., polyvinyl butyral, polyvinyl formal; the cellulose ethers, e.g., methyl cellulose, ethyl cellulose, and benzyl cellulose; the cellulose esters, e.g., cellulose acetate, cellulose acetate succinate and cellulose acetate butyrate; as well as the natural and modified natural polymers such as gutta percha, cellulose, gelatin, starch, silk, wool, and the like; the siloxane polymers and copolymers; the formaldehyde polymers such as polyformaldehyde; formaldehyde resins such as phenol-formaldehyde, melamine-formaldehyde, urea-formaldehyde, aniline-formaldehyde and acetone-formaldehyde; phenolic resins and the like. The photosensitizers or photoinitiators used in the instant invention fall into many classes and include compounds such as benzoin derivatives, as disclosed in German Pat. No. F523401VC/396, acetophenone, propiophenone, xanthone, fluorenone, benzaldehyde, fluorene, anthraquinone, triphenylamine, carbazole, 3- or 4- methylacetophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'-benzylbenzophenone, 3'-chloro-xanthone, 3,9-dichloroxanthone, thioxanthone, and chlorinated thioxanthones, 3-chloro-8-nonylxanthone, 3-methoxy-xanthone, 3-iodo-7-methoxyxanthone, and the like.

Also included are the acetophenone photosensitizers of the type described in U.S. Pat. No. 3,715,293, having the structure

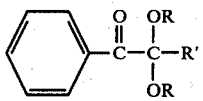

I.

wherein R is alkyl of from 1-8 carbon atoms, or aryl with 6 carbon atoms, and R' is hydrogen, alkyl of from 1-8 carbon atoms, aryl of from 6-14 carbon atoms or cycloalkyl of 5-8 carbon atoms.

The alkylphenone photosensitizers having the formula

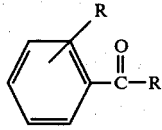

II.

the benzophenone type photosensitizers having the formula

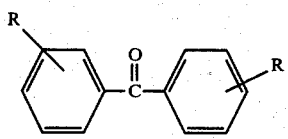

III.

the tricyclic fused ring type having the formula

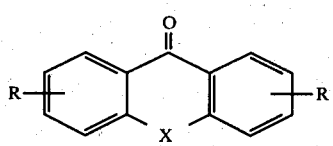

IV.

and the pyridyl type having the formula

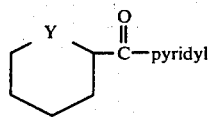

V.

wherein the various substituents are as further described in U.S. Pat. No. 3,759,807, are also included.

Other photosensitizers include 1- and 2-chloroanthraquinone, 2-methylanthraquinone, 2-tertiary butyl anthraquinone, octamethylanthraquinone, 1,4-naphthoquinone, 9-10-phenanthrenequinone, 1,2-benzanthraquinone, 2-3-benzanthraquinone, 2-methyl-1,4-naphthoquinone, 2-3-dichloronaphthoquinone, 1,4-dimethylanthraquinone, 2-3-dimethylanthraquinone, 2-phenylanthraquinone, 2-3-diphenylanthraquinone, sodium salts of anthraquinone alpha-sulfonic acid, 3-chloro-2-methylanthraquinone, and the like. Other photoinitiators which are also useful are described in U.S. Pat. No. 2,760,863 and include vicinal ketadonyl compounds, such as diacetyl benzyl, etc., alpha ketadonyl alcohols, such as benzoin, pivaloin, etc., acyloin ethers, e.g., benzoin methyl and ethyl ethers, etc., alpha hydrocarbon substituted aromatic acyloins, including alpha-methyl benzoin, alpha-allyl benzoin, and alpha-phenyl benzoin. Also included are the diacylhalomethanes, corresponding to one of the general formulas:

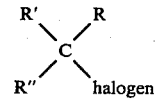

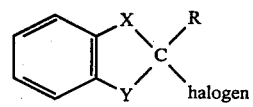

wherein halogen represents a halogen atom such as chlorine or bromine; R represents a hydrogen atom, a chlorine or bromine atom, or an acetyloxy group; R' and R" (same or different) represent a benzoyl group, a nitrobenzoyl group, a dimethylamino benzoyl group, a phenyl sulfonyl group, a carboxy phenyl sulfonyl group, a methylphenyl sulfonyl group, or a naphthoyl group; and X and Y (same or different) represent a carbonyl group or a sulfonyl group. Included are 2-bromo-1,3-diphenyl-1,3-propane dione; 2,2-dibromo-1,3-indane dione; 2,2-dibromo-1,3-diphenyl-1,3-propane dione; 2-bromo-2-(phenylsulfonyl acetal phenone) and the like, as further described in U.S. Pat. No. 3,615,455.

Other photoinitiators are cataloged by G. Delzenne in *Industrie Cimique Belge*, 24 (1959), 739,764. Most preferred among the added initiators are benzoin and its alkyl ethers, benzophenone and its derivatives, as in Formula III, xanthone, thioxanthones, chlorinated thioxanthones, and acetophenone derivatives, as set out in Formula I, and halogenated, aliphatic and aromatic polychlorinated biphenyls and polyphenyls.

The photosensitizers can be added in an amount of about 0.5 to about 15 weight percent based upon the total curable system, and preferably about 0.1 to about 5 percent.

Although not required for every photoinitiator, certain organic amines can be added to the photosensitizers above-described to further enhance the cure rate of the compositions of the instant invention in amounts up to about 500 weight percent, based on the weight of the photosensitizer, preferably up to about 50 weight percent. The amines can be primary, secondary, or tertiary, and are illustrated by amine compounds such as methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, tricyclohexenylamine, tricyclohexadienylamine, tricyclopentadienylamine, N-methyl-N-cyclohexylamine, N-2-ethylhexyl-N-cyclohexylamine, diphenylamine, phenyldimethylamine, methylphenylamine, ditolylamine, trixylyl amine, tribenzylamine, triphenethylamine, benzyldimethylamine, benzyldihexylamine, and the like. The preferred organic amines are the tertiary amines, with the alkanol amines being most preferred. The specific preferred amine activators are triethanolamine, morpholine and methyldiethanolamine.

The compositions of the instant invention after being prepared in the ratios as set out above can be applied to the material to be coated by conventional application means, including spraying, dipping, curtain and roll coating, and may, if desired, be dried under ambient or oven conditions to provide coating films on the substrate. A flash period may also be incorporated to remove substantial portions of the water, especially in those conditions where coatings having solids in the lower end of the preferred range are utilized. However, in order to insure that the self-pigmenting nature of the coatings of the instant invention is maintained, the flash or dry period should not exceed about 10 minutes and the temperatures employed should not exceed about 150° C., preferably about 100° C. The substrate can be of any composition, e.g., wood, metal, paper, plastic, fabric, fiber, ceramic, concrete, plaster, glass, etc.

Typically, a mixture of the compositions described above in combination with the photoinitiator and, where utilized, the amine activator, is prepared and the composition sprayed onto the desired substrate. It is then exposed to electromagnetic radiation having wave lengths of above about 2000 Angstrom units, preferably from about 2000 up to about 5000 Angstroms. Exposure should be from a source located about 1 to 12 inches from the coating for a time sufficient to cause crosslinking of the compositions and can range from about 0.1 seconds up to about 1 min./linear ft. Generally, the light radiation will have power of about 200 watts per linear inch.

The light radiation can be ultraviolet light generated from low, medium and high pressure mercury lamps. This equipment is readily available and its use is well known to those skilled in the art of radiation chemistry.

In the following examples, all parts and percentages are by weight, unless otherwise indicated.

EXAMPLE 1

A dispersion was prepared by first adding 50 grams of trimethylolpropane triacrylate to 30 grams of EPI-REZ 510 diacrylate (epoxy resin, Celanese), and then 20 grams of hexanediol diacrylate, 2.5 grams of sodium dioctyl sulfusuccinate and 10 grams of water were slowly added to this mixture while agitating with a high shear mixer such as a Cowles blade agitator. The resulting dispersion was modified with 5 weight percent benzoin isobutyl ether, based upon the monomer weight, and ultraviolet cured for 0.5 seconds with a Hanovia 100 watt medium pressure ultraviolet lamp. The resulting coating was flat white, opaque, and had a good adhesion to steel. Coating application thicknesses ranged from 1-6 mils and were in each case solvent resistant, indicating substantial degrees of cure.

EXAMPLE 2

A 50 gram quantity of trimethylolpropane triacrylate was added to 30 grams of EPI-REZ 510 diacrylate and 20 grams of hexanediol diacrylate. A 2.5 gram quantity of aerosol OT was mixed with 10 grams of water, and the mixture was slowly added to the acrylate monomer mixture while agitating with a high shear mixture. When coated and cured with benzoin isobutyl ether as in Example 1, the film was hard and opaque.

EXAMPLE 3

A 60 gram quantity of hexanediol diacrylate, 20 grams of trimethylolpropane triacrylate, 20 grams of an acrylated polyester and 5 grams of Igepal DM 710 (GAF) were mixed together. A 12 gram quantity of water was added slowly to this mixture while agitating with a high shear stirrer. The resulting dispersion, when applied and cured as set out in Example 1 to various film thicknesses, was flat white and exhibited good solvent resistance.

What is claimed is:

1. A process for obtaining a white self-pigmented ultraviolet cured coating composition which comprises:
    (a) forming a dispersion of water in monomers at about the 35 to 85 percent by weight solids level, utilizing about 20 to about 100 weight percent, by weight, based upon the solids portion of said dispersion, of emulsifiable alpha beta ethylenically unsaturated vinyl polymerizable compound containing on the average at least about two sites of alpha beta ethylenic unsaturation per molecule; up to about 60 weight percent on the same basis, of emulsifiable monounsaturated monomer; about 1 to about 20 weight percent, of a surfactant; and about 0.5 to about 15 weight percent, based on the total composition weight, of an ultraviolet photoinitiator;
    (b) applying said dispersion to a substrate as a coating; and
    (c) curing the substrate coating to a white, substantially opaque state by exposure to ultraviolet light.

2. A process in accordance with claim 1 wherein an amine activator is added in addition to the ultraviolet photoinitiator.

3. A process in accordance with claim 1 wherein a flash period is employed before ultraviolet curing.

4. A white self-pigmented cured coating composition prepared in accordance with the process of claim 1.

* * * * *